United States Patent Office 2,799,473
Patented July 16, 1957

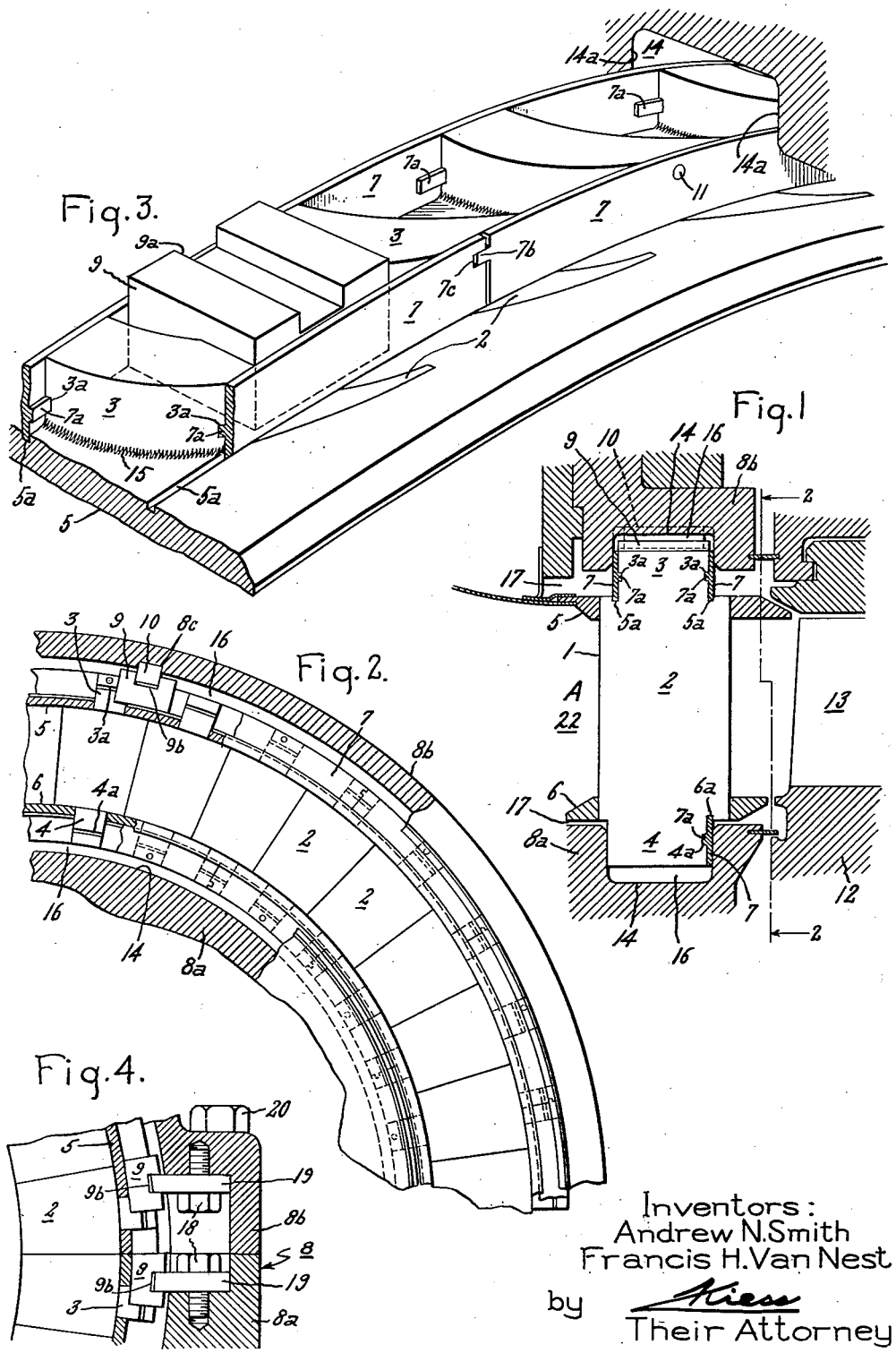

2,799,473

GAS TURBINE NOZZLE RING

Andrew N. Smith, Scotia, and Francis H. Van Nest, Schenectady, N. Y., assignors to General Electric Company, a corporation of New York Application April 27, 1955, Serial No. 504,164

8 Claims. (Cl. 253—78)

This invention relates to a high temperature gas turbine, particularly to the structure of the nozzle assembly for directing hot motive fluid to the bucket wheel.

It is desirable that these turbines start quickly requiring high temperatures to bring the unit up to speed with the result that the turbine is subjected to a rapid increase in temperature and attendant expansion of the turbine parts. In contrast to steam turbines, changes in load on gas turbines are normally accompanied by changes in temperature of the motive fluid entering the turbine.

The blades on the turbine bucket wheel are, of course, free to expand longitudinally into the clearance space provided in the casing. However, if the stationary nozzle blades are welded or otherwise solidly secured to the turbine casing structure, rapid heating of the blades and the surrounding band members may cause substantial differential expansion and set up very high stresses which may result in cracking of welds and rupture of the blades or other supporting structure.

Accordingly, it is an object of this invention to provide a nozzle ring assembly which is free to expand in response to increased temperatures.

A further object is to provide a seal surrounding the nozzle ring which prevents the hot motive fluid from bypassing the nozzle blade.

A further object is to provide a seal which utilizes the thrust force, and the increased temperature of the motive fluid to provide a better sealing action between the nozzle assembly and the stator housing.

A still further object is to permit construction of a nozzle ring having relatively thin sidewalls of constant cross-section so that the distortion of the nozzle assembly is kept at a minimum.

Other objects and advantages will become apparent from the following description taken in connection with the accompanying drawings in which Fig. 1 is a longitudinal section through a gas turbine nozzle ring incorporating the invention, Fig. 2 is an end view of the nozzle assembly taken on the irregular plane 2—2 in Fig. 1, Fig. 3 is a perspective view partially in section showing the nozzle outer sidewall and the construction of the upper portion of the nozzle assembly, and Fig. 4 is a sectional view showing the "centerline support" of the nozzle ring.

Generally stated, the invention is practiced by providing a nozzle assembly which is disposed in a stator housing so that it is permitted to radially expand in response to increased temperatures. The nozzle assembly includes sealing means disposed between the stator housing and the adjacent band members to prevent the leakage of motive fluid around the nozzle ring.

Referring now more particularly to Fig. 1, the invention is shown as applied to a high temperature gas turbine. The gas turbine bucket wheel 12 has a shaft supported in suitable bearings (not shown) and a circumferential row of open-ended or "shroudless" buckets 13. Details of the compressor, bearing arrangement, etc. are not material to the understanding of the present invention.

Located adjacent the gas turbine bucket wheel 12 is a fabricated nozzle assembly A. This assembly directs the hot motive fluid received from the nozzle inlet passage 22 to the buckets 13 to drive the turbine. The nozzle ring proper comprises a pair of radially spaced concentric annular band members 5, 6 having a plurality of circumferentially spaced air-foil shaped nozzle partitions 1 disposed therebetween and having end portions extending therethrough. The nozzle partition 1 comprises a blade 2 extending through the outer and inner bands 5, 6 and lugs 3, 4 extending beyond the bands. The bands 5, 6 consist of two 180° segments fastened together. The cross-section shape of the blades 2 may be seen in Fig. 3. As will be apparent from Figs. 1 and 3, the bands 5, 6 are provided with circumferentially spaced openings of a shape similar to and of a size to fit the respective ends of the blades 2. The outer end of each blade passes through an opening in band 5 and is welded thereto as indicated at 15 in Fig. 3. The inner end of the blade projects through band 6 and is welded thereto in a manner similar to that disclosed for the upper portion of the blade 2.

The bands 5, 6 are relatively thin and are of substantially constant thickness. This use of constant section bands results in a minimum temperature differential within the band. This minimizes the distortion of the nozzle.

The lug portions 3, 4 extend radially into annular recesses 14 defined by stator members 8a, 8b of stator housing 8 adjacent the band members 5, 6. The lugs 3, 4 are machined off to give a flat bearing area (see Fig. 3) to provide a supporting surface for the nozzle assembly in the stator housing. The relationship between the lugs 3, 4 and the recesses 14 are such as to provide a space 16 between the end of the lug and the end surface of the recess. This space permits the nozzle assembly to expand radially in response to an increase in temperature. This prevents the nozzle assembly from being distorted any appreciable amount.

With the nozzle casing constructed in this manner there are openings 17 defined between the stator housing 8 and the bands 5, 6 through which motive fluid may by-pass the nozzle blade 2. This tendency to leak results from the pressure differential existing across the nozzle assembly. This leakage would take place between the circumferentially adjacent lug portions extending through the bands. To prevent this leakage, seal pieces 7 are located between the circumferentially adjacent lug portions. The seal pieces 7 are disposed in grooves 5a, 6a defined by the bands 5, 6 respectively and extend radially into the stator recesses 14. The seal pieces extend circumferentially between the adjacent lug portions and are disposed between the sidewalls 14a of recesses 14 and the nozzle lug portions 3, 4.

The seal pieces are maintained radially fixed relative to the lugs by the tongues 7a which are disposed in grooves 3a, 4a defined by the lugs 3, 4 respectively. This tongue and groove connection between the seal piece and the lug permits differential thermal expansion to take place therebetween. They are circumferentially interconnected by the tongue and groove arrangement 7b, 7c located intermediate the side surface of the lug portions. To prevent the seal pieces from working their way circumferentially around the nozzle casing, they are pinned to the lugs by pins 11. By way of example only, the seal pieces may be thus pinned to alternate lug portions with the tongue and groove connections 7b, 7c disposed adjacent the side surfaces of the lug portions intermediate those which are pinned to the seal pieces. Thus it can be seen, that the seal pieces are positively located relative to the band members, lug portions, and stator housing.

The seal pieces 7 are illustrated as being located on both sides of the upper lug portion 3 but only on one side of the lower lug portion 4. This is by way of example only, since, if desired, seal pieces can be located on both sides of the lower lug portion 4 or on just one side of the upper lug 3. If there is to be only one seal piece adjacent the upper lug 3, it would be located on the outlet (right-hand) side of the nozzle partition 1.

The primary sealing effect provided by the seal pieces 7 results from the close fit between the seal piece and the stator housing. However, this sealing function is supplemented by the thrust forces and the increased temperature of the motive fluid passing through the nozzle ring. The thrust forces result from the high pressure of motive fluid flowing through the nozzle ring. These forces are transmitted up through the lugs and urge the sealing pieces on the outlet (right-hand) side of the nozzle into a tighter sealing engagement with the stator housing. The effect of the high temperature of the motive fluid is to expand the lugs which in turn acts to make a tighter seal between the seal pieces on both sides of the lug and the stator housing.

The nozzle assembly A is "center-line supported" in the stator housing 8 to permit the nozzle to grow with temperature change while maintaining the nozzle assembly coaxial relative to the buckets 13. This support is provided by a plurality of block and key arrangements, each of which comprises a block 9 and a key 10. The block 9 is slidably disposed between the seal pieces 7 and circumferentially adjacent lugs 3, 3 which are squared off to permit the use of a rectangular block. The block 9 defines a key-way 9a adapted to receive a key 10. The upper part of the key is disposed in a key-way 8c defined by the stator housing 8b (see Fig. 2). The radial dimension of the key 10 is slightly less than the radial distance between keyways 8c, 9a to form gap 9b to permit radial expansion of the nozzle assembly. As can be seen from Fig. 4 the keys 19 disposed in the blocks 9 adjacent the centerline of the nozzle ring are secured to the stator housing 8 by bolts 18. The two halves 8a and 8b of the stator housing are connected by bolts 20. This construction is duplicated on the opposite side.

In assembly, the nozzle rings are made up in 180° segments. The nozzle partitions are disposed between the bands 5, 6 with their lugs 3, 4 extending therethrough. The lugs are welded to the bands to form a unitary structure. The seal pieces 7 are then disposed in the grooves defined by the lugs and the band members to positively locate them relative to the nozzle ring. The blocks 9 are then located between the adjacent lugs 3 so that the ring can be positively supported by the stator housing. The key 19 adjacent the ring centerline is secured to the stator housing by bolts 18. After both segments are connected to the stator housing in this manner the housing portions 8a, 8b are connected by bolts 20.

The operation of the nozzle assembly can be seen from the following:

When hot motive fluid is applied to the nozzle assembly the blade 2 and bands 5, 6 expand as a unit in response to the temperature increase. This expansion is transferred to the lug portion 3 which moves upward in recess 14. The lug 3 also expands in response to the temperature increase caused by the motive fluid by-passing the nozzle blade 2 through opening 17. This causes lug 3 to move still further into recess 14. Due to the guiding action of the stator 8 the expansion takes place in a radial direction in the recesses 14. During the expansion of lug members 3, 4 the seal pieces 7 are carried along with the lugs 3, 4 further into recess 14. However, the grooves 5a, 6a are sufficiently deep so that regardless of the expansion of lug members 3, 4 the seal pieces are still disposed in grooves 5a, 6a to prevent the motive fluid from leaking under the seal pieces.

The sealing effect of the seal pieces is increased by the action of the thrust forces of the motive fluid acting on the nozzle assembly. These thrust forces act on the lugs 3, 4 to provide a better seal between the seal pieces and housing to prevent more effectively the leakage of motive fluid around the nozzle assembly. Thermal expansion of the lugs in an axial direction urges the seal pieces against the stator housing to provide a more positive sealing action between the seal pieces and the housing.

This assembly permits the use of relatively thin band members of substantially constant thickness. This maintains a small temperature differential within the band members which serves to keep the distortion of the nozzle assembly at a minimum.

Thus it will be seen that the invention provides an improved nozzle assembly which is permitted to expand in response to increased temperatures and the motive fluid is prevented from leaking around the nozzle assembly. In addition, it permits the use of relatively thin band members of substantially constant cross-section so that the temperature differential within the band members and their resulting distortion is kept to a minimum.

While only one embodiment of the invention has been described specifically, it will be apparent to those skilled in the art that many alterations and substitutions of mechanical equivalents may be made. For instance, the seal pieces 7 may be connected to the lug portions 3 by means of a tack-weld or they may be pinned to each of the lugs. Also, the blades may be attached by other equivalent means instead of being welded. In addition, the nozzle assembly may be centerline supported in the stator housing by an assembly in which the block 9 is secured to the band member 5 thus not limiting its use to where it is located between parallel seal pieces 7.

It is, of course, desired to cover by the appended claims all such modifications as fall within the true spirit and scope of the invention.

What we claim as new and desire to secure by Letters Patent of the United States is:

1. In a high temperature turbine having a bucket wheel receiving motive fluid from at least one nozzle means, the combination of a nozzle assembly disposed coaxially with and adjacent the bucket wheel and comprising radially spaced concentric annular band members each having a plurality of circumferentially spaced radially aligned elongated openings, a plurality of circumferentially spaced radially extending nozzle partitions, each nozzle partition consisting of a nozzle blade having a lug extending from its inner and outer ends, each nozzle blade having end portions disposed through said aligned openings in the inner and outer bands respectively, means securing said end portions of the nozzle blades to the respective band members, an outer stator housing surrounding said nozzle assembly and defining a first circumferential annular recess disposed adjacent to and adapted to receive the outer lugs of the nozzle blades, an inner stator housing member disposed within said inner band member and spaced radially therefrom and defining therewith a second circumferential annular recess disposed adjacent to and adapted to receive the inner lugs of the nozzle blades, sealing means located between the band members and the respective inner and outer stator housing for preventing motive fluid from by-passing the nozzle blades, a plurality of radial key means supporting said nozzle assembly relative to the stator housing, each of said key means including a block disposed adjacent the outer band member and between adjacent lugs, the block defining a first axially extending key-way in its outer surface, the outer stator housing adjacent the block defining a second key-way, and key means disposed in said cooperating key ways so that the nozzle assembly is free to expand radially in response to changes in temperature.

2. In a high temperature turbine having a bucket wheel receiving motive fluid from at least one nozzle passage, the combination of a nozzle assembly disposed coaxially with and adjacent the bucket wheel and comprising radially spaced concentric annular band members each having a plurality of circumferentially spaced radially aligned elongated openings, a plurality of circumferentially spaced radially extending nozzle partitions, each nozzle partition consisting of a nozzle blade having a lug extending from its inner and outer ends, each nozzle blade having end portions disposed through said aligned openings in the inner and outer bands respectively, means securing said end portions of the nozzle blades to the respective band members, a stator housing surrounding said nozzle assembly and defining an inner and outer annular recess disposed adjacent to and adapted to receive the inner and outer lugs respectively of the nozzle blades, and sealing means comprising seal pieces disposed on both sides of the lugs and secured thereto, the lugs and adjacent seal pieces being slidably disposed in their corresponding cooperating recesses in the stator housing, each seal piece extending radially away from its band member to the adjacent stator housing and circumferentially between adjacent lugs to prevent the leakage of motive fluid between the stator housing and the band members, and key means supporting said nozzle assembly relative to the stator housing whereby the nozzle assembly is free to expand radially in response to changes in temperature.

3. A nozzle assembly in accordance with claim 2 in which the nozzle assembly support means includes a plurality of block members each block disposed between adjacent outer lugs and the seal pieces disposed on both upstream and downstream sides of the outer lugs, each block member defining a first axial key-way in its outer surface, the stator housing adjacent the block defining a second key way, and a key member disposed in each pair of said cooperating key ways, whereby the nozzle assembly is supported coaxial with the bucket wheel and free to expand radially in response to changes in temperature.

4. For use in a high temperature turbine having a bucket wheel receiving motive fluid from at least one nozzle means, a nozzle assembly adapted to be disposed coaxially with and adjacent the bucket wheel and comprising radially spaced concentric annular band members each having a plurality of circumferentially spaced radially aligned elongated openings, a plurality of circumferentially spaced radially extending nozzle partitions, each nozzle partition consisting of a nozzle blade having a lug extending from its inner and outer ends, each nozzle blade having end portions disposed through said aligned openings in the inner and outer bands respectively, means securing said end portions of the nozzle blades to the respective band members, a stator housing surrounding said nozzle assembly, the stator housing defining an inner and outer annular recess disposed adjacent to and adapted to receive the inner and outer lugs respectively of the nozzle partitions, sealing means for preventing the motive fluid from by-passing the nozzle blades, the sealing means comprising radially extending arcuate pieces of thin metal slidably disposed in the inner and outer recesses of the stator housing members, the seal pieces being secured against radial movement relative to the inner and outer lugs by a tongue and groove connection defined by the seal piece and adjacent lugs, said seal pieces extending radially from the recesses in the stator housing members to the adjacent band members and extending circumferentially to seal the leakage paths defined between adjacent lugs, the band members defining circumferential grooves into which the seal pieces extend whereby thermal expansion of the lug may take place without disengaging the edge of the seal piece from sealing engagement with said groove, and key means supporting said nozzle assembly relative to the stator housing whereby the nozzle assembly is free to expand in response to changes in temperature.

5. In a nozzle assembly structure in accordance with claim 4 and including dowel pin means for connecting each seal piece to at least one lug to prevent the seal piece from shifting circumferentially relative to the nozzle assembly.

6. For use in a high temperature turbine having a bucket wheel receiving motive fluid from at least one nozzle means, a nozzle assembly adapted to be disposed coaxially with and adjacent the bucket wheel and comprising radially spaced concentric annular band members each having a plurality of circumferentially spaced radially aligned elongated openings, a plurality of circumferentially spaced radially extending nozzle partitions, each nozzle partition consisting of a nozzle blade having a lug extending from its inner and outer ends, the lugs being subject to the high temperature of the motive fluid, each nozzle blade having end portions disposed through said aligned openings in the inner and outer bands respectively, means securing said end portions of the nozzle blades to the respective band members, an outer stator housing surrounding said nozzle assembly and defining an outer annular recess disposed adjacent to and adapted to receive the outer lugs of the nozzle blades, an inner stator housing member disposed within said inner band member and spaced radially therefrom and defining therewith a second circumferential annular recess disposed adjacent to and adapted to receive the inner lugs of the nozzle blades, and sealing means comprising seal pieces secured to the lugs which are slidably disposed in the lugs corresponding recess in the stator housing, the seal pieces extending radially inwardly to its adjacent band member and circumferentially to substantially close the spaces defined between adjacent lugs.

7. For use in a high temperature turbine having a bucket wheel receiving motive fluid from at least one nozzle means, a nozzle assembly adapted to be disposed coaxially with and adjacent the bucket wheel and comprising radially spaced concentric annular band members each having a plurality of circumferentially spaced radially aligned elongated openings, the band members being relatively thin and having a substantially constant cross-section, a plurality of circumferentially spaced radially extending nozzle partitions, each nozzle partition consisting of a nozzle blade having a lug extending from its inner and outer ends, each nozzle blade having end portions disposed through said aligned openings in the inner and outer bands respectively, the end portions of the nozzle blades being welded to their respective band members, an outer stator housing surrounding said nozzle assembly and defining a first circumferential annular recess disposed adjacent to and adapted to receive the outer lugs of the nozzle blades, an inner stator housing member disposed within said inner band member and spaced radially therefrom and defining therewith a second circumferential annular recess disposed adjacent to and adapted to receive the inner lugs of the nozzle blades, sealing means for preventing the motive fluid from by-passing the nozzle blades, the sealing means comprising radially extending arcuate pieces of thin metal slidably disposed in the inner and outer recesses of the stator housing members, the seal pieces being secured against radial movement relative to the inner and outer lugs by a tongue and groove connection defined by the seal pieces and adjacent lugs, said seal pieces extending radially from the recesses in the stator housing members to the adjacent band members and extending circumferentially to seal the leakage paths defined between the adjacent lugs, pin means for connecting the seal pieces to the lugs to prevent circumferential movement, the band members defining circumferential grooves into which the seal pieces extend whereby thermal expansion of the lug may take place without disengaging the edge of the seal piece from sealing engagement with said groove, connecting means supporting said nozzle assembly relative to the stator housing, the connecting means includes a block disposed between circumferentially adjacent outer lugs and the seal pieces disposed on both sides of the outer lugs, the block defining a first key way in its outer surface, the stator housing adjacent the block defining a second key way, and a key adapted to be disposed in said key ways whereby the nozzle assembly is supported so that it is free to freely expand radially in response to changes in temperature.

8. For use in a high temperature turbine having a bucket wheel receiving motive fluid from at least one nozzle means, a nozzle assembly adapted to be disposed coaxially with and adjacent the bucket wheel and comprising radially spaced concentric annular band members each having a plurality of circumferentially spaced radially aligned elongated openings, a plurality of circumferentially spaced radially extending nozzle partitions, each nozzle partition consisting of a nozzle blade having a lug extending from its inner and outer ends, each nozzle blade having end portions disposed through said aligned openings in the inner and outer bands respectively, means securing said end portions of the nozzle blades to the respective band members, an outer stator housing surrounding said nozzle assembly and defining a first circumferential annular recess disposed adjacent to and adapted to receive the outer lugs of the nozzle blades, an inner stator housing member disposed within said inner band member and spaced radially therefrom and defining therewith a second circumferential annular recess disposed adjacent to and adapted to receive the inner lugs of the nozzle blades, sealing means for preventing the leakage of motive fluid between the stator housing and the band members, said sealing means comprising seal pieces disposed adjacent said inner and outer lugs and slidably disposed in said first and second annular recesses, each seal piece extending radially between the stator housing and the surface of the adjacent band member and extending circumferentially to substantially close the spaces defined between adjacent lugs.

References Cited in the file of this patent

UNITED STATES PATENTS

| 2,488,875 | Morley | Nov. 22, 1949 |
| 2,625,013 | Howard et al. | Jan. 13, 1953 |
| 2,640,679 | Wheatley | June 2, 1953 |
| 2,718,350 | Burgess | Sept. 20, 1955 |

FOREIGN PATENTS

| 542,197 | Great Britain | Dec. 30, 1941 |
| 1,081,027 | France | June 2, 1954 |